US009832455B2

United States Patent
Liu et al.

(10) Patent No.: US 9,832,455 B2
(45) Date of Patent: Nov. 28, 2017

(54) STEREO CAMERA AND AUTOMATIC RANGE FINDING METHOD FOR MEASURING A DISTANCE BETWEEN STEREO CAMERA AND REFERENCE PLANE

(71) Applicant: VIVOTEK INC., New Taipei (TW)

(72) Inventors: Cheng-Chieh Liu, New Taipei (TW); Shih-Ming Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 308 days.

(21) Appl. No.: 14/803,096

(22) Filed: Jul. 19, 2015

(65) Prior Publication Data
US 2016/0088288 A1    Mar. 24, 2016

(30) Foreign Application Priority Data
Sep. 18, 2014  (TW) .............................. 103132315 A

(51) Int. Cl.
| | |
|---|---|
| H04N 13/02 | (2006.01) |
| G01C 3/02 | (2006.01) |
| G01C 3/08 | (2006.01) |
| G01C 11/06 | (2006.01) |

(52) U.S. Cl.
CPC .......... *H04N 13/0271* (2013.01); *G01C 3/02* (2013.01); *G01C 3/085* (2013.01); *G01C 11/06* (2013.01); *H04N 13/0203* (2013.01); *H04N 2213/003* (2013.01)

(58) Field of Classification Search
CPC .......... H04N 13/0271; H04N 13/0203; H04N 2213/003; G01C 3/02; G01C 3/085; G01C 11/06
USPC ........................................... 348/140
See application file for complete search history.

(56) References Cited

U.S. PATENT DOCUMENTS

| | | | |
|---|---|---|---|
| 2004/0151401 A1* | 8/2004 | Sawhney .................. | G06T 3/40 382/299 |
| 2008/0122922 A1* | 5/2008 | Geng ............... | G08B 13/19628 348/39 |
| 2011/0043604 A1* | 2/2011 | Peleg .................... | G06T 3/4038 348/36 |
| 2012/0242796 A1* | 9/2012 | Ciurea ................... | H04N 5/232 348/46 |
| 2013/0003864 A1* | 1/2013 | Sullivan ................. | H04N 19/44 375/240.25 |
| 2015/0294160 A1* | 10/2015 | Takahashi .......... | G06K 9/00791 382/104 |

* cited by examiner

*Primary Examiner* — Jay Patel
*Assistant Examiner* — Salame Amr
(74) *Attorney, Agent, or Firm* — Winston Hsu

(57) ABSTRACT

An automatic range finding method is applied to measure a distance between a stereo camera and a reference plane. The automatic range finding method includes acquiring a disparity-map video by the stereo camera facing the reference plane, analyzing the disparity-map video to generate a depth histogram, selecting a pixel group having an amount greater than a threshold from the depth histogram, calculating the distance between the stereo camera and the reference plane by weight transformation of the pixel group, and applying a coarse-to-fine computation for the disparity-map video.

9 Claims, 9 Drawing Sheets

STEREO CAMERA AND AUTOMATIC RANGE FINDING METHOD FOR MEASURING A DISTANCE BETWEEN STEREO CAMERA AND REFERENCE PLANE

BACKGROUND OF THE INVENTION

1. Field of the Invention

The present invention relates to a stereo camera, and more particularly, to a stereo camera and a related automatic range finding method of measuring a distance between the stereo camera and a reference plane.

2. Description of the Prior Art

Installation of a conventional stereo camera for people-flow tracing is complicated because calibration parameters of the camera have to be manually set while installing, and then the camera can accurately determine a size and a height of an object for analysis and illustration of people-flow tracing operation. Also, computation performance of a conventional stereo camera is low because the huge amount of data used for people-flow tracing operation, and a life span of the camera is decreased accordingly. Thus, design of a stereo camera capable of automatically determining calibration parameters and effectively decreasing computation quantity of the people-flow tracing operation to increase computation performance is an important issue in the related surveillance industry.

SUMMARY OF THE INVENTION

The present invention provides a stereo camera and a related automatic range finding method of measuring a distance between the stereo camera and a reference plane for solving above drawbacks.

According to the claimed invention, an automatic range finding method capable of measuring a distance between a stereo camera and a reference plane is disclosed. The automatic range finding method includes acquiring a disparity-map video by the stereo camera facing the reference plane, analyzing the disparity-map video to generate a depth histogram, selecting a pixel group having an amount greater than a threshold from the depth histogram, calculating the distance between the stereo camera and the reference plane by weight transformation of the pixel group, and applying a coarse-to-fine computation for the disparity-map video.

According to the claimed invention, a stereo camera with an automatic range finding function capable of measuring a distance relative to a reference plane is disclosed. The stereo camera includes an image sensor and an operating processor. The image sensor faces the reference plane to acquire a disparity-map video containing an object. The operating processor is electrically connected to the image sensor and adapted to analyze the disparity-map video to generate a depth histogram, select a pixel group having an amount greater than a threshold from the depth histogram and calculate the distance between the stereo camera and the reference plane by weight transformation of the pixel group so as to apply a coarse-to-fine computation for the disparity-map video.

The stereo camera of the present invention can automatically estimate the distance of the stereo camera relative to the reference plane, and automatically determine parameters of the object correspondingly for the distance, so as to dramatically decrease time and procedure of manual adjustment. Besides, the automatic range finding method applied to the stereo camera of the present invention can apply the coarse-to-fine computation for the disparity-map video, to accurately find out the top of the object (which can be the human head) for analysis of the people-flow information and illustration of people-flow trace distribution.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
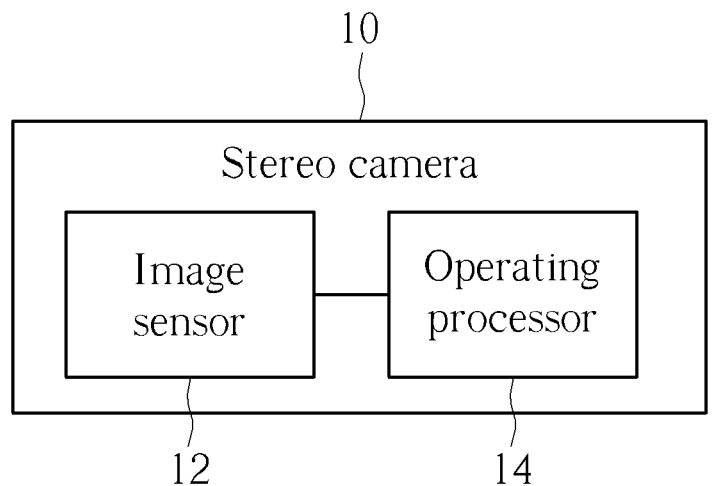
FIG. 1 is a functional block diagram of a stereo camera according to an embodiment of the present invention.
Figure 2:
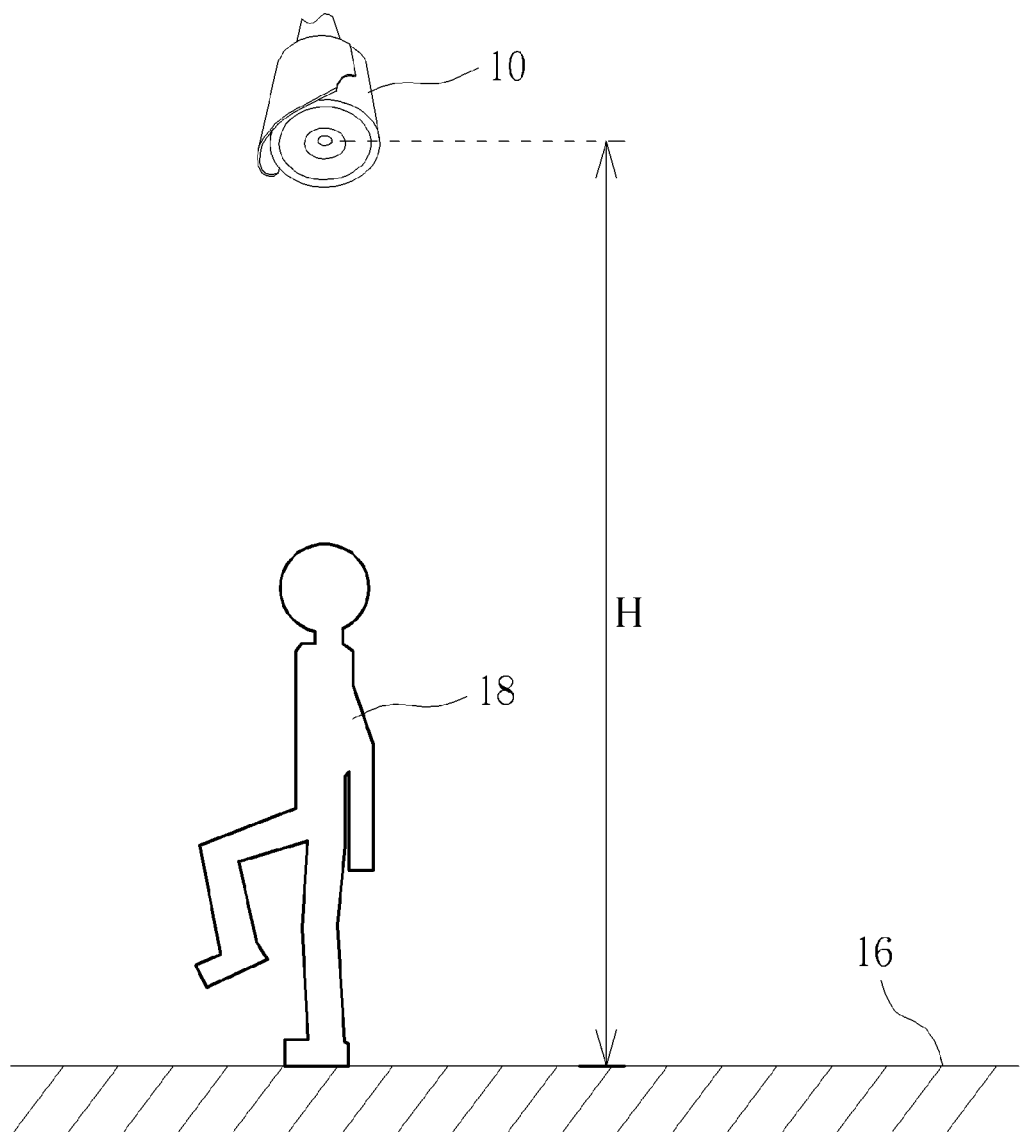
FIG. 2 is a scene diagram of the stereo camera according to the embodiment of the present invention.

Please refer to FIG. 1 and FIG. 2. FIG. 1 is a functional block diagram of a stereo camera 10 according to an embodiment of the present invention. FIG. 2 is a scene diagram of the stereo camera 10 according to the embodiment of the present invention. The stereo camera 10 includes an image sensor 12 and an operating processor 14 electrically connected with each other. The stereo camera 10 is disposed on a high position in ordinary and has two camera lenses arranged in parallel. An optical axis of the camera lens is substantially vertical to a reference plane 16, and the camera lens can capture an image containing an object 18 located on a reference plane 16, but not limited, so as to monitor motion of the object 18 within a sensing range of the stereo camera 10. For example, the reference plane 16 can be the ground or the floor, the object 18 can be the human body, and motion of the object 18 represents a moving trace of the human body. The image sensor 12 faces toward the reference plane 16 to acquire a disparity-map video containing the object 18. The operating processor 14 analyzes and measures a distance H between the stereo camera 10 and the reference plane 16 according to the disparity-map video for an automatic range finding function. It should be mentioned that while there in no object 18 located on the reference plane 16, the operating processor 14 of the present invention may analyze and measure the distance H between the stereo camera 10 and the reference plane 16 for the automatic range finding function according to the disparity-map video captured by the image sensor 12 facing the reference plane 16.

Figure 3:
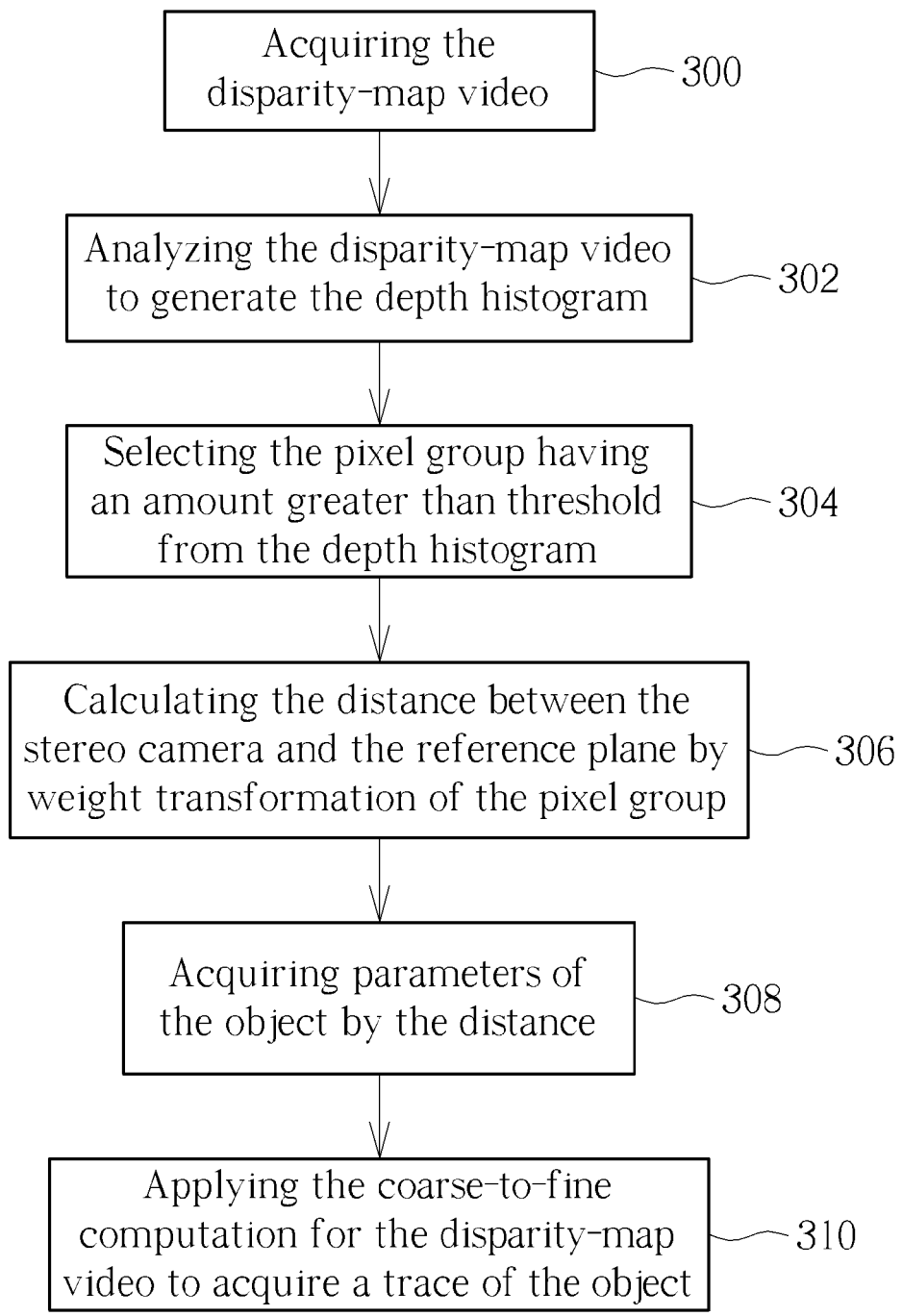
FIG. 3 is a flow chart of an automatic range finding method according to the embodiment of the present invention.
Figure 4:
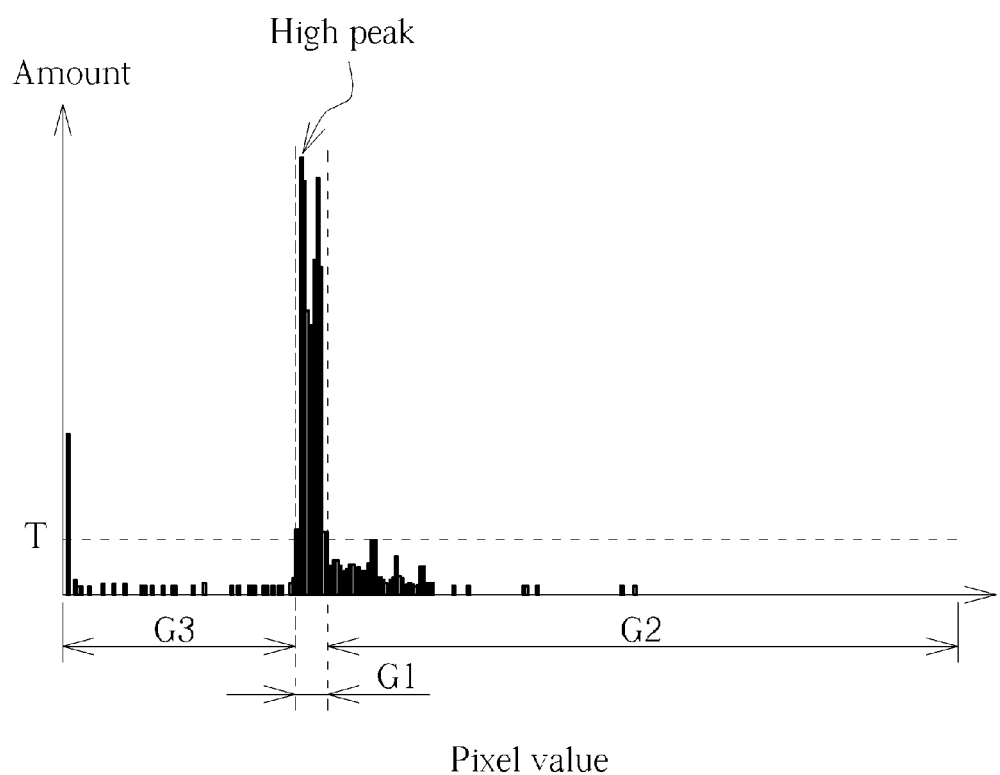
FIG. 4 is a depth histogram transformed by the disparity-map video according to the embodiment of the present invention.
Figure 11:
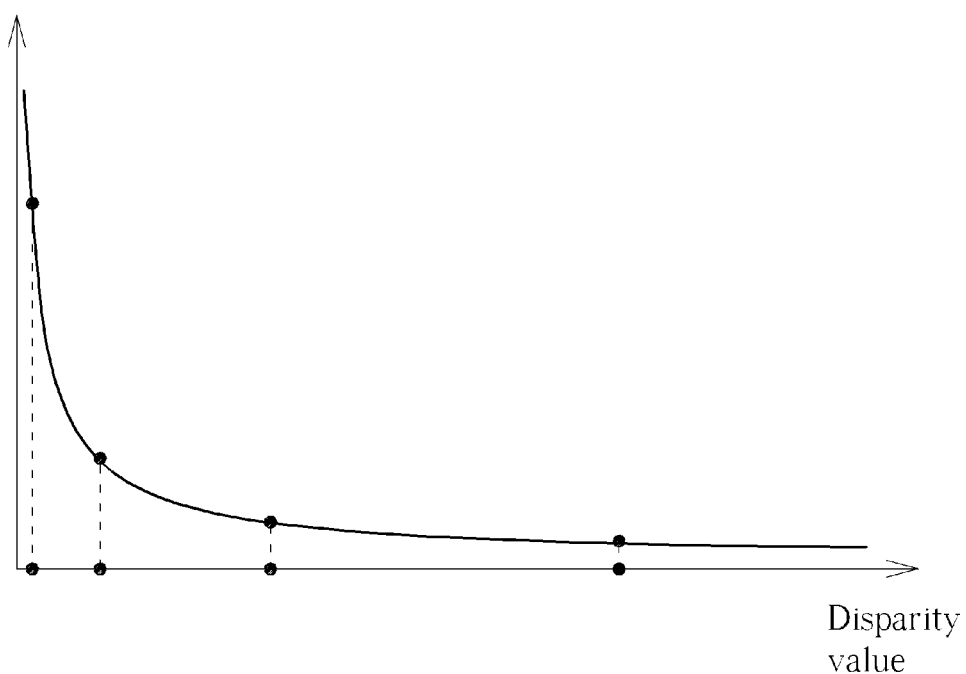
FIG. 11 is a relative diagram of a disparity value and a distance related to the stereo camera according to the embodiment of the present invention.

Please refer to FIG. 3 and FIG. 4. FIG. 3 is a flow chart of an automatic range finding method according to the embodiment of the present invention. FIG. 4 is a depth histogram transformed by the disparity-map video according to the embodiment of the present invention. The automatic range finding method illustrated in FIG. 3 is suitable for the stereo camera 10 shown in FIG. 1. First, step 300 is executed and the operating processor 14 drives the image sensor 12 to face the reference plane 16 and to acquire the disparity-map video. Then, steps 302 and 304 are executed so that the operating processor 14 analyzes the disparity-map video to generate the depth histogram, finds out a high peak with a lowest disparity value from the depth histogram, and sets the high peak and several peaks adjacent to the foresaid high peak as a pixel group of the ground or the floor. A large proportion of the disparity-map video is the ground or the floor, and a disparity value of the ground is lowest because the ground is farthest from the stereo camera 10 (as shown in FIG. 11), so that the pixel group G1 consisting the high peak in the depth histogram represents information of the reference plane 16, and the pixel groups G2, G3 represent information excluding the reference plane 16.

Step 306 is executed that the operating processor 14 calculates the distance H between the stereo camera 10 and the reference plane 16 by weight transformation of each pixel value of the pixel group G1. In the embodiment, a weighted mean method is adopted to perform the weight transformation. Weighting of each pixel value in the weighted mean method corresponds to a pixel amount of the pixel value, which means each pixel value of the pixel group G1 has the corresponding weighting according to its amount in the depth histogram, but not limited, except having the same weighting. The stereo camera 10 can automatically calculate a height and a size of the object 18 at the present disposed height while the distance H (which means an installation height or a suspended distance of the stereo camera 10 from the ground or floor) is acquired. For example, step 308 is executed to acquire at least one parameter of the object 18 by the operating processor 14 through the distance H. The foresaid parameter may be selected from a group consisting of a minimal distance between the stereo camera 10 and the object 18 (such as a distance of the stereo camera 10 relative to the human head) and/or dimensions of the object 18 (such as a size, a diameter, a length and/or a width of the human head within the captured image).

The stereo camera 10 can include one or more mapping tables. The mapping table has a series of mapping information such as the distance H and parameters of the object 18. For example, one of the mapping information can be: a diameter of the human head in the captured image is equal to 26 centimeters and a distance relative to the human head is equal to 230 centimeters while the distance H equals 400 centimeters. As the calculated distance H can be found in the mapping table, the operating processor 14 acquires the corresponding parameter of the object 18 directly by the mapping table; as the distance H cannot be found in the mapping table, interpolation calculation is utilized to calculate the parameter of the object 18 with the mapping table. Parameter acquirement of the object 18 is not limited to the above-mentioned embodiment, which depends on design demand. Final, step 310 is executed to apply a coarse-to-fine computation for the disparity-map video to find out position of the object 18 in the disparity-map video, so as to conveniently trace a movement of the object 18.

Figure 5:
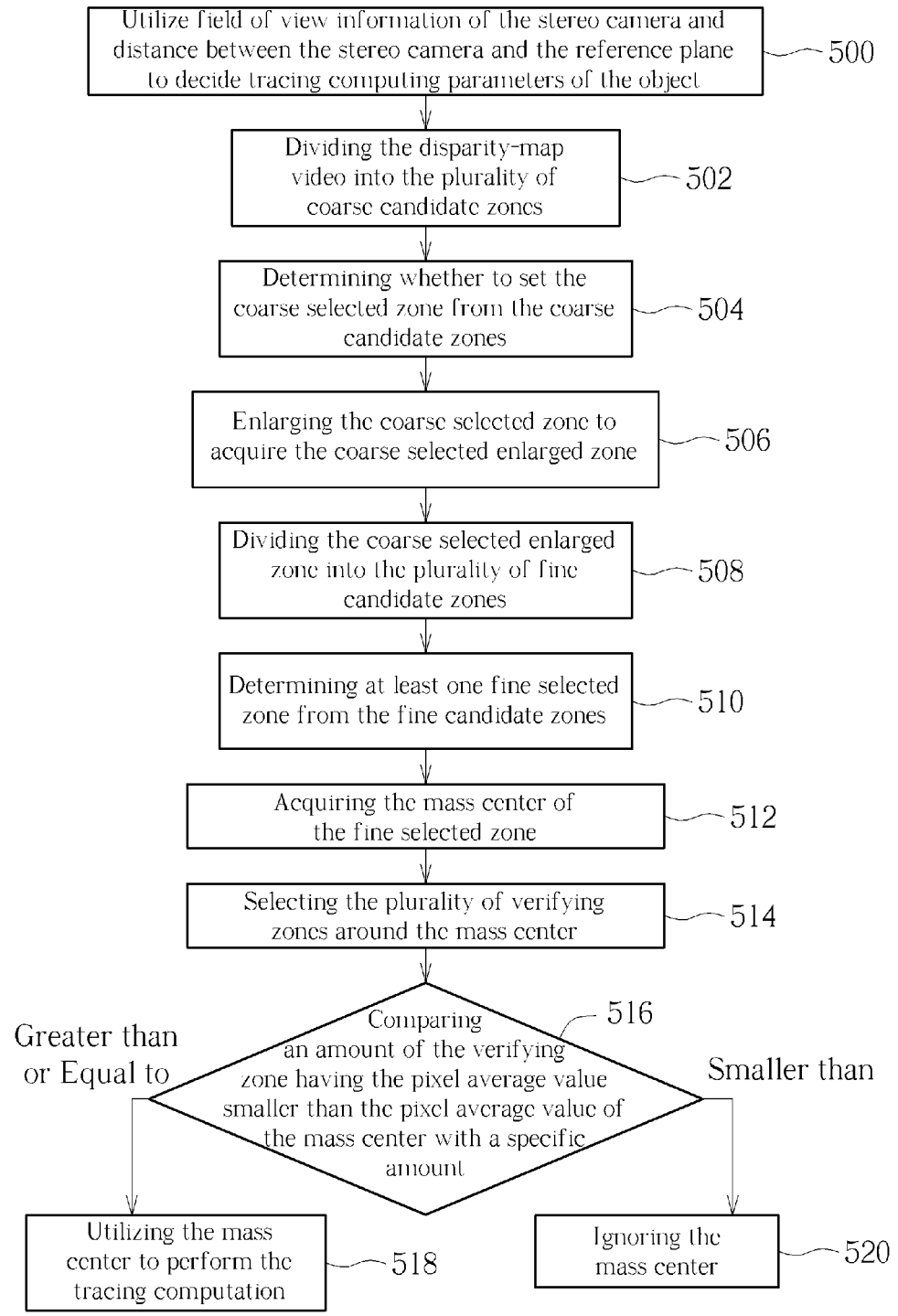
FIG. 5 is a flow chart of the coarse-to-fine computation according to the embodiment of the present invention.
Figure 6:
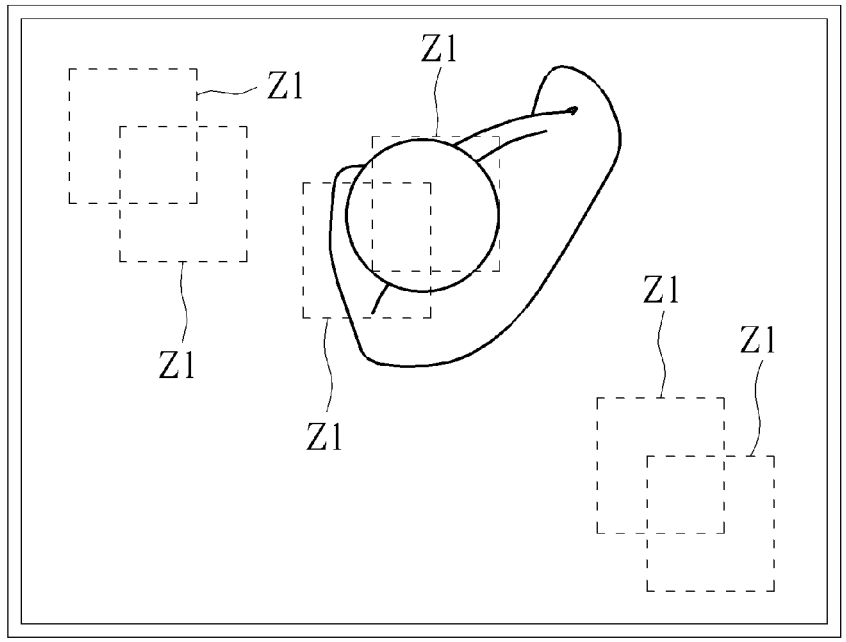
FIG. 6 and FIG. 7 respectively are diagrams of the disparity-map video marked by the coarse candidate zone and the coarse selected zone according to the embodiment of the present invention.
Figure 7:
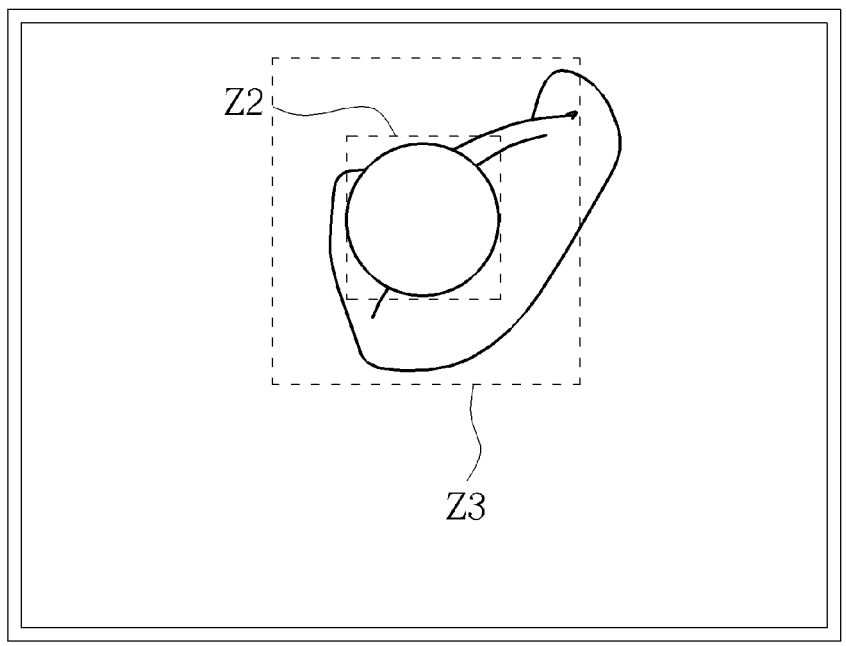

Please refer to FIG. 5. FIG. 5 is a flow chart of the coarse-to-fine computation according to the embodiment of the present invention. The coarse-to-fine computation illustrated in FIG. 5 particularly describes step 310 shown in FIG. 3. The coarse-to-fine computation applied for the disparity-map video has steps as following. First, step 500 is executed and the operating processor 14 utilizes field of view information of the stereo camera 10 and the distance H between the stereo camera 10 and the reference plane 16 to decide tracing computing parameters M and N of the object 18, wherein M, N are positive integers. The operating processor 14 chooses small numbers of M, N while the view field is wide or the distance H is higher, and chooses large numbers of M, N while the view field is narrow or the distance H is lower. Then, steps 502 and 504 are executed that the operating processor 14 divides the disparity-map video into a plurality of coarse candidate zones Z1, each of the coarse candidate zones Z1 has a length of M pixels and a width of N pixels, and the operating processor 14 determines whether to set at least one coarse selected zone Z2 from the plurality of coarse candidate zones Z1. Please refer to FIG. 6 and FIG. 7. FIG. 6 and FIG. 7 respectively are diagrams of the disparity-map video marked by the coarse candidate zone Z1 and the coarse selected zone Z2 according to the embodiment of the present invention. The coarse candidate zones Z1 may be partly overlapped or separated from each other without overlapping, any overlapped type and shapes and dimensions of overlapped sections are not limited to the embodiment shown in FIG. 6 and FIG. 7, which depend on design demand.

Step 504 of determining whether to set at least one coarse selected zone Z2 from the plurality of coarse candidate zones Z1 can include steps of comparing a pixel average value of the coarse candidate zones Z1 with a whole pixel average value of the disparity-map video, or comparing the pixel average value of the coarse candidate zones Z1 with a pixel average value of an adjacent zone. As shown in FIG. 6 and FIG. 7, the operating processor 14 calculates an integral image value of the disparity-map video by an integral image computing method, which means an integral value of each pixel on the whole depth histogram image are calculated. The integral value of a pixel is the sum of pixel value of all pixels within a rectangle formed on the image, including pixels upon four edges of the rectangle, and the rectangle is formed by a diagonal line from the foresaid pixel to another pixel located at an upper-left corner on the image. The operating processor 14 further utilizes the integral image value to calculate a pixel average value of each coarse candidate zone Z1, which means the sum of pixel value of the coarse candidate zone Z1 is calculated before calculating the pixel average value of the coarse candidate zone Z1. That is, the integral image value can be utilized to rapidly acquire the sum of pixel value of the coarse candidate zone Z1 by once addition and twice subtraction, dramatically decreases computation amounts. As the pixel average value of the coarse candidate zone Z1 is compared with the pixel average value of the adjacent zones in step 504, the operating processor 14 may set the coarse candidate zone Z1, which has the pixel average value greater than or equal to the pixel average value of the adjacent coarse candidate zones Z1, as the coarse selected zone Z2.

It should be further mentioned that the foresaid adjacent coarse candidate zones Z1 can be four first circumambient zones abutting upon a right side, a left side, a below side and an above side of the central coarse candidate zone Z1, or can be eight first circumambient zones abutting upon a right side, a left side, a below side, an above side, an upper-right corner, a bottom-right corner, an upper-left corner and a bottom-left corner of the central coarse candidate zone Z1, or further can have four or eight second circumambient zones abutting against the first circumambient zones through the above-mentioned sides and corners. Variation of the circumambient zones is not limited to the foresaid embodiment, and depends on actual demand. For example, the specific coarse candidate zone Z1 located on a center of the disparity-map video may have four or eight adjacent coarse candidate zones Z1, and another specific coarse candidate zone Z1 located on edges of the disparity-map video (such as the zone Z1 on the upper-left corner) does not have the upper adjacent zone, the left adjacent zone and the upper-left adjacent zone for comparison; in the meantime, average value of the absent zones (which represent the upper adjacent zone, the left adjacent zone and the upper-left adjacent zone) equals zero (which means the distance H between the stereo camera 10 and the absent zone are infinite) for the comparison, or the absent zones may be ignored without comparison. Actual application of the absent zones is determined according to design demand.

For comparing the pixel average value of the coarse candidate zone Z1 with the whole pixel average value of the disparity-map video in step 504, the integral value of the bottom-right pixel can be divided by the whole pixel amount to acquire the whole pixel average value of the disparity-map video while the integral image value of the disparity-map video is acquired, so as to dramatically decrease computation amounts. Method of calculating the whole pixel average value of the disparity-map video is not limited to the above-mentioned embodiment. Then, the pixel average value of each coarse candidate zone Z1 is compared with the whole pixel average value of the disparity-map video, and the coarse candidate zone Z1 which has the pixel average value greater than or equal to the whole pixel average value of the disparity-map video is set as the coarse selected zone Z2. Therefore, the present invention provides two setting methods about the coarse selected zone Z2, so the stereo camera 10 can choose the appropriate setting method about the coarse selected zone according to computation performance, predetermined scheme or any factors.

As the object 18 with sufficient height is located within the sensing range of the stereo camera 10, the coarse selected zone Z2 is at least one of the plurality of coarse candidate zones Z1. However, the object 18 may be not located within the sensing range of the stereo camera 10, or the object 18 may not be sensed due to insufficient height, and the coarse selected zone Z2 is not always set in the disparity-map video while executing step 504.

Figure 8:
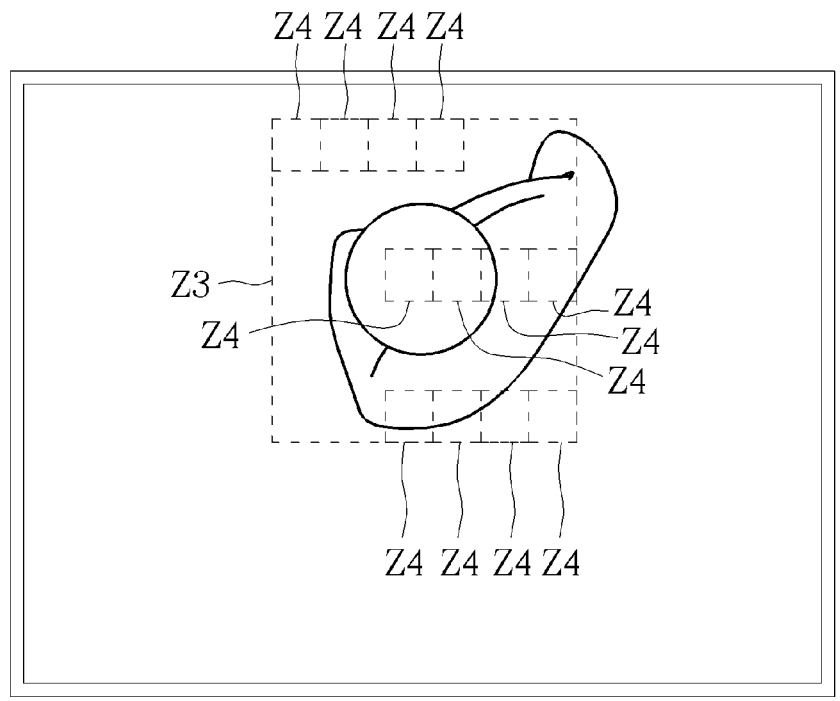
FIG. 8 to FIG. 9 respectively are diagrams of the disparity-map video marked by the coarse selected enlarged zone, the fine candidate zone, the fine selected zone and the mass center according to the embodiment of the present invention.
Figure 9:
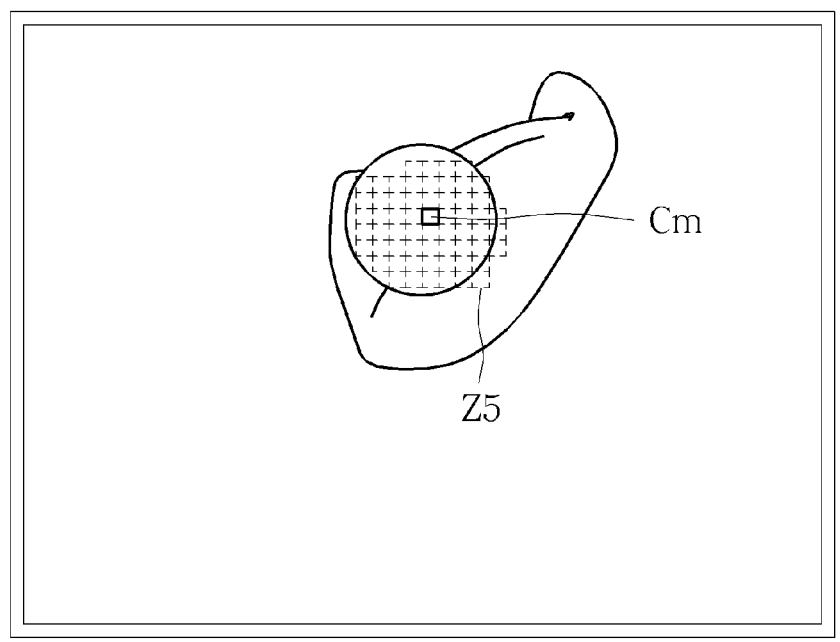

Please refer to FIG. 7 to FIG. 9. FIG. 7 to FIG. 9 respectively are diagrams of the disparity-map video marked by the coarse selected enlarged zone Z3, the fine candidate zone Z4, the fine selected zone Z5 and the mass center Cm according to the embodiment of the present invention. Step 506 to step 512 are executed that the operating processor 14 enlarges the coarse selected zone Z2 to acquire the coarse selected enlarged zone Z3, divides the coarse selected enlarged zone Z3 into a plurality of fine candidate zones Z4, and each of the fine candidate zones Z4 has a length of m pixels and a width of n pixels, wherein m, n are positive integers, and transverse amplification factor and vertical amplification factor of the coarse selected zone Z2 changed into the coarse selected enlarged zone Z3 can be identical or different from each other. For example, the coarse selected enlarged zone Z3 may be 2 times or 1.5 times the dimensions of the coarse selected zone Z2. As mentioned above, the operating processor 14 can utilize the field of view information of the stereo camera 10 and the distance H between the stereo camera 10 and the reference plane 16 to decide m, n. The operating processor 14 chooses small numbers of m, n while the view field is wide or the distance H is higher, and chooses large numbers of m, n while the view field is narrow or the distance H is lower. The fine candidate zones Z4 can be partly overlapped or separated from each other optionally, any overlapped type and shapes and dimensions of overlapped sections are not limited to the embodiment shown in FIG. 8 and FIG. 9, which depend on design demand. The operating processor 14 further can determine at least one fine selected zone Z5 (which is top of the object 18, such as the human head) from the plurality of fine candidate zones Z4 by comparison with the pixel average value of the coarse selected enlarged zone Z3, and position of the mass center Cm of the at least one fine selected zone Z5 can be acquired according to normal geometric calculation.

For executing step 510 of determining the fine selected zone Z5 from the plurality of fine candidate zones Z4, the operating processor 14 can utilize the integral image value of the disparity-map video (which is acquired in step 504) to calculate the pixel average value of the coarse selected enlarged zone Z3 and the pixel average value of each fine candidate zone Z4. The operating processor 14 compares the pixel average value of the fine candidate zone Z4 with the pixel average value of the coarse selected enlarged zone Z3, so as to set the fine candidate zone Z4 which has the pixel average value greater than or equal to the pixel average value of the coarse selected enlarged zone Z3 as the at least one fine selected zone Z5.

Figure 10:
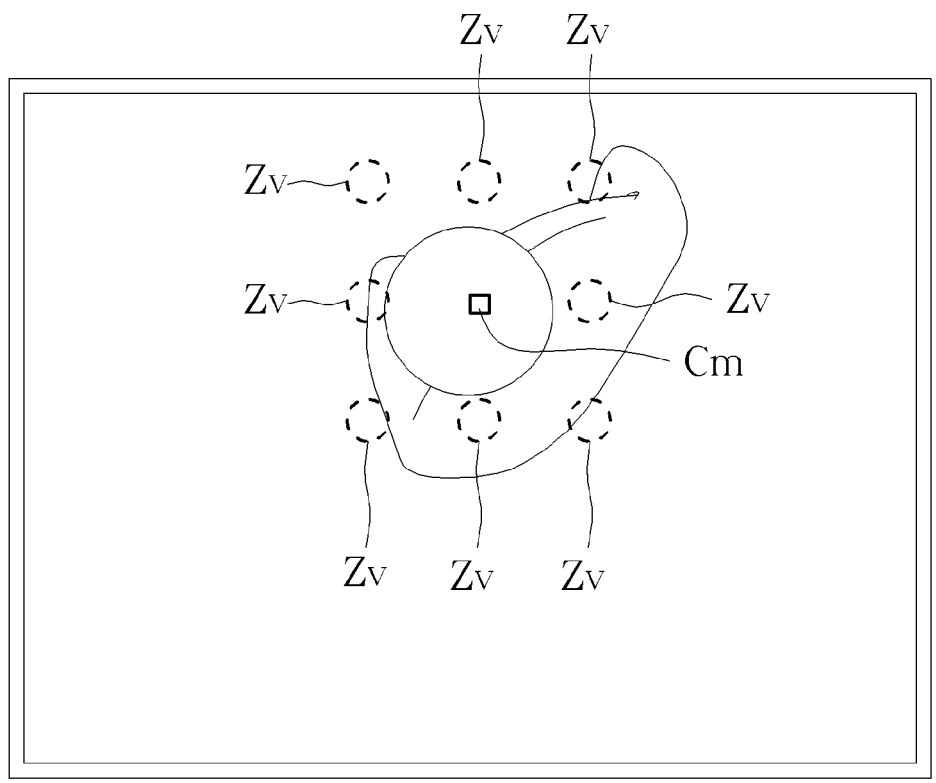
FIG. 10 is a diagram of the disparity-map video marked by the verifying zone according to the embodiment of the present invention.

Please refer to FIG. 10. FIG. 10 is a diagram of the disparity-map video marked by the verifying zone Zv according to the embodiment of the present invention. The mass center Cm can be a single pixel or a section composed of several pixels. Steps 514 and 516 are executed to ensure the mass center Cm is correct, such as conforming to the human head. The operating processor 14 selects a plurality of verifying zones Zv (each can be a single pixel or a section composed of several pixels) around the mass center Cm, and compares a pixel average value (or a pixel value) of the mass center Cm with the pixel average value (or a pixel value) of each verifying zone Zv. The pixel average value of the mass center Cm (as the mass center Cm is the section composed of several pixels) and the pixel average value of the verifying zone Zv (as the verifying zone Zv is the section composed of several pixels) can be, but not limited to, calculated by the above-mentioned integral image value calculating method. A distance between each verifying zone Zv and the mass center Cm and an amount of the verifying zone Zv are set according to design demand; for example, the embodiment marks eight verifying zones Zv on the disparity-map video shown in FIG. 10. While an amount of the verifying zone Zv, which has the pixel average value (or the pixel value) smaller than or equal to the pixel average value (or the pixel value) of the mass center Cm, is greater than or equal to a threshold, position of the mass center Cm conforms to the top of the object 18, and step 518 is executed to perform tracing computation by the mass center Cm for tracing and counting functions of people-flow information. The threshold can be a predetermined value (for example, the threshold is six in FIG. 10), and the tracing computation can be any algorithm (such as Kalman Filter) to trace a top movement of the object 18. While the amount of the verifying zone Zv, which has the pixel average value (or the pixel value) smaller than or equal to the pixel average value (or the pixel value) of the mass center Cm, is smaller than the predetermined value, position of the mass center Cm does not conform to the top of the object 18, and step 520 is executed to ignore the mass center Cm and may further to recalculate and verify the mass center.

In conclusion, the stereo camera and the automatic range finding method of measuring the distance between the stereo camera and the reference plane of the present invention can automatically estimate the distance of the stereo camera relative to the reference plane, and automatically determine parameters of the object correspondingly for the distance, so as to dramatically decrease time and procedure of manual adjustment. Besides, the stereo camera and the automatic range finding method of measuring the distance between the stereo camera and the reference plane of the present invention can apply the coarse-to-fine computation for the disparity-map video, to accurately find out the top of the object (which can be the human head) for analysis of the people-flow information and illustration of people-flow trace distribution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic range finding method capable of measuring a distance between a stereo camera and a reference plane, the automatic range finding method comprising:
    acquiring a disparity-map video by the stereo camera facing the reference plane;
    analyzing the disparity-map video to generate a depth histogram;
    selecting a pixel group having an amount greater than a threshold from the depth histogram;
    calculating the distance between the stereo camera and the reference plane by weight transformation of the pixel group;
    acquiring at least one parameter of an object according to the distance between the stereo camera and the reference plane;
    utilizing field of view information of the stereo camera and the distance between the stereo camera and the reference plane to decide tracing computing parameters M and N, wherein M and N are positive integers;
    dividing the disparity-map video into a plurality of coarse candidate zones wherein each coarse candidate zone has a length of M pixels and a width of N pixels;
    determining whether to set at least one coarse selected zone from the plurality of coarse candidate zones;
    enlarging the coarse selected zone to acquire a coarse selected enlarged zone;
    dividing the coarse selected enlarged zone into a plurality of fine candidate zones wherein each fine candidate zone has a length of m pixels and a width of n pixels, wherein m and n are positive integers;
    determining at least one fine selected zone from the plurality of fine candidate zones; and
    acquiring position of a mass center of the at least one fine selected zone.

2. The automatic range finding method of claim 1, wherein the at least one parameter is selected from a group consisting of a minimal distance between the stereo camera and the object and a size of the object.

3. The automatic range finding method of claim 1, wherein a step of acquiring the at least one parameter of the object comprises:
    utilizing a mapping table to acquire the at least one parameter of the object, or utilizing the mapping table and interpolation calculation to acquire the at least one parameter of the object.

4. The automatic range finding method of claim 1, wherein a step of determining the at least one fine selected zone from the plurality of fine candidate zones comprises:
    calculating an integral image value of the disparity-map video by an integral image computing method;
    calculating a pixel average value of the coarse selected enlarged zone according to the integral image value;
    comparing a pixel average value of the fine candidate zone with a pixel average value of the coarse selected enlarged zone; and
    setting the fine candidate zone having a pixel average value greater than or equal to the pixel average value of the coarse selected enlarged zone as the at least one fine selected zone.

5. The automatic range finding method of claim 1, further comprising:
    selecting a plurality of verifying zones around the mass center;
    comparing a pixel value of the mass center with a pixel average value of each verifying zone; and
    determining whether to execute tracing computation according to a comparison result.

6. The automatic range finding method of claim 5, wherein the position of the mass center is utilized to execute the tracing computation while an amount of the verifying zone having the pixel average value smaller than or equal to the pixel value of the mass center is greater than or equal to a specific amount.

7. A stereo camera with an automatic range finding function capable of measuring a distance relative to a reference plane, the stereo camera comprising:
    an image sensor facing the reference plane to acquire a disparity-map video containing an object; and
    an operating processor electrically connected to the image sensor and adapted to analyze the disparity-map video to generate a depth histogram, select a pixel group having an amount greater than a threshold from the depth histogram and calculate the distance between the stereo camera and the reference plane by weight transformation of the pixel group, so as to acquire at least one parameter of an object according to the distance between the stereo camera and the reference plane, to utilize field of view information of the stereo camera and the distance between the stereo camera and the reference plane to decide tracing computing parameters M and N, to divide the disparity-map video into a plurality of coarse candidate zones wherein each coarse candidate zone has a length of M pixels and a width of N pixels, to determine whether to set at least one coarse selected zone from the plurality of coarse candidate zones, to enlarge the coarse selected zone to acquire a coarse selected enlarged zone, to divide the coarse selected enlarged zone into a plurality of fine candidate zones wherein each fine candidate zone has a length of m pixels and a width of n pixels, to determine at least one fine selected zone from the plurality of fine candidate zones, and to acquire position of a mass center of the at least one fine selected zone, wherein M and N are positive integers, and m and n are positive integers.

8. An automatic range finding method capable of measuring a distance between a stereo camera and a reference plane, the automatic range finding method comprising:
- acquiring a disparity-map video by the stereo camera facing the reference plane;
- analyzing the disparity-map video to generate a depth histogram;
- selecting a pixel group having an amount greater than a threshold from the depth histogram;
- calculating the distance between the stereo camera and the reference plane by weight transformation of the pixel group;
- acquiring at least one parameter of an object according to the distance between the stereo camera and the reference plane;
- utilizing field of view information of the stereo camera and the distance between the stereo camera and the reference plane to decide tracing computing parameters M and N, wherein M and N are positive integers;
- dividing the disparity-map video into a plurality of coarse candidate zones wherein each coarse candidate zone has a length of M pixels and a width of N pixels;
- calculating an integral image value of the disparity-map video by an integral image computing method;
- calculating a pixel average value of each coarse candidate zone according to the integral image value;
- comparing the pixel average value of the each coarse candidate zone with a pixel average value of an adjacent coarse candidate zone abutting upon the each coarse candidate zone; and
- setting a coarse candidate zone having a pixel average value greater than or equal to the pixel average value of the adjacent coarse candidate zone as a coarse selected zone.

9. An automatic range finding method capable of measuring a distance between a stereo camera and a reference plane, the automatic range finding method comprising:
- acquiring a disparity-map video by the stereo camera facing the reference plane;
- analyzing the disparity-map video to generate a depth histogram;
- selecting a pixel group having an amount greater than a threshold from the depth histogram;
- calculating the distance between the stereo camera and the reference plane by weight transformation of the pixel group;
- acquiring at least one parameter of an object according to the distance between the stereo camera and the reference plane;
- utilizing field of view information of the stereo camera and the distance between the stereo camera and the reference plane to decide tracing computing parameters M and N, wherein M and N are positive integers;
- dividing the disparity-map video into a plurality of coarse candidate zones wherein each coarse candidate zone has a length of M pixels and a width of N pixels;
- calculating an integral image value of the disparity-map video by an integral image computing method;
- calculating a pixel average value of each coarse candidate zone according to the integral image value;
- calculating a whole pixel average value of the disparity-map video;
- comparing the pixel average value of the each coarse candidate zone with the whole pixel average value of the disparity-map video; and
- setting a coarse candidate zone having a pixel average value greater than or equal to the whole pixel average value of the disparity-map video as a coarse selected zone.

* * * * *